US012754328B2

(12) United States Patent
Ore

(10) Patent No.: US 12,754,328 B2
(45) Date of Patent: Oct. 6, 2026

(54) SYSTEM FOR NAVIGATING IN CAVITIES INCLUDING A PLATFORM FOR MOBILIZING THE SAME

(71) Applicant: Moshe Ore, Hod Ha'Sharon (IL)

(72) Inventor: Moshe Ore, Hod Ha'Sharon (IL)

(*) Notice: Subject to any disclaimer, the term of this patent is extended or adjusted under 35 U.S.C. 154(b) by 225 days.

(21) Appl. No.: 18/766,937

(22) Filed: Jul. 9, 2024

(65) Prior Publication Data

US 2025/0012930 A1 Jan. 9, 2025

Related U.S. Application Data

(60) Provisional application No. 63/525,686, filed on Jul. 9, 2023.

(51) Int. Cl.
*G01S 19/49* (2010.01)

(52) U.S. Cl.
CPC .................................... *G01S 19/49* (2013.01)

(58) Field of Classification Search
USPC .................................................... 342/22, 175
See application file for complete search history.

(56) References Cited

U.S. PATENT DOCUMENTS

| | | | | |
|---|---|---|---|---|
| 5,227,799 A * | 7/1993 | Kimura | G01V 3/15 | 342/22 |
| 7,511,654 B1 * | 3/2009 | Goldman | G01V 3/15 | 342/179 |
| 7,683,821 B1 * | 3/2010 | Clodfelter | F41H 11/16 | 342/22 |
| 8,188,745 B2 * | 5/2012 | Overby | G01V 3/12 | 342/22 |
| 9,043,028 B2 * | 5/2015 | Miller | B25J 9/1684 | 700/258 |
| 11,468,631 B2 * | 10/2022 | Ore | G01S 17/89 | |
| 2020/0217666 A1 * | 7/2020 | Zhang | G05D 1/242 | |
| 2020/0309529 A1 * | 10/2020 | Lambert | G05D 1/0246 | |
| 2021/0339685 A1 * | 11/2021 | Adams | H04N 23/57 | |

* cited by examiner

*Primary Examiner* — Bernarr E Gregory
(74) *Attorney, Agent, or Firm* — Tutunjian & Bitetto, P.C.

(57) ABSTRACT

A mobile platform for operating a system comprising a mobile device and a location determination component, and a method, the mobile platform includes one or more stands collectively having a hollow for stably receiving the mobile device. A location determination device can be placed in at least two locations on the stands, thereby enabling to obtain an initial orientation of the mobile device. The location determination device is also adapted to obtain a location indication of a location associated with a cavity. During operation of the system, the mobile device is removed from the hollow after the orientation is obtained, moved within a cavity, and provides location information, thereby providing descriptive information of the cavity associated with real world coordinates.

19 Claims, 9 Drawing Sheets

SYSTEM FOR NAVIGATING IN CAVITIES INCLUDING A PLATFORM FOR MOBILIZING THE SAME

CROSS-REFERENCE TO RELATED APPLICATIONS

The present application claims priority from U.S. Provisional Patent Application Ser. No. 63/525,686, filed Jul. 9, 2023, entitled "A SYSTEM FOR NAVIGATING IN CAVITIES INCLUDING A PLATFORM FOR MOBILIZING THE SAME" which is incorporated herein by reference.

TECHNICAL FIELD

Embodiments of the disclosure relate to mapping areas in general, and to a system including a mobile platform for carrying a system for mapping and localizing areas, in particular.

BACKGROUND

"Navigation in different areas, even for the first time in an unknown area has become significantly easier since Global Positioning Systems (GPS) and Global Navigation Satellite System (GNSS) have been introduced and became widely available. As for mapping fully or partly internal spaces and navigating therein, methods and devices exist such as accelerometer measurements, cameras, Wi-Fi® networks, or the like. Real-world coordinates within indoor areas can be obtained by combining GPS locations obtained at or near the entrance to such spaces, with these techniques. Such techniques are particularly required for tasks that require the real-world coordinates within the internal space."

Currently available systems may comprise, in addition to the mapping and navigation devices mentioned above, also a plurality of components, including one or more capture devices such as one or more cameras, video cameras, thermal cameras, or the like. The system may further comprise mapping devices such as a Simultaneous Localization and Mapping (SLAM) device, a radar or a Lidar.

However, in order for the mapping results of the available systems and methods, accurate initial positioning is required, while the systems and methods are highly sensitive to localization errors, which are more than likely for structurally complex devices, in particular in unstructured outdoor environments.

BRIEF SUMMARY

One exemplary embodiment of the disclosed subject matter is a mobile platform for operating a system comprising at least a mobile device and a location determination component, the mobile platform comprising: one or more stands, the one or more stands collectively having a hollow for stably receiving the mobile device, wherein a location determination device can be placed in at least two locations on the at least one stand, thereby enabling to obtain an initial orientation of the mobile device, wherein the location determination device is also adapted to obtain a location indication of a location associated with a cavity, and wherein during operation of the system, the mobile device is removed from the hollow after the orientation is obtained, moved within a cavity, and provides location information, thereby providing descriptive information of the cavity associated with real world coordinates. Within the mobile platform, the one or more stands optionally comprise two stands, and when operating the system, the two stands are optionally placed such that the mobile device is placed in corresponding cavities of the two stands. Within the mobile platform, the mobile device is optionally a probe. Within the mobile platform, the one or more stands are optionally designed such that the location determination component can be mounted on the one or more stands. An apparatus may comprise: the mobile platform; the mobile device; and the location determination component.

Another exemplary embodiment of the disclosed subject matter is a mobile platform for operating a system comprising at least a mobile device and a location determination component, the mobile platform comprising: a first positioning area for positioning the mobile device, such that the mobile device is stably located when placed within the first positioning area; a positioning member comprising a connection for receiving a location determination device and connectable to the mobile platform in two positions, such that a line connecting the connection for a location determination device when the positioning member is connected to the mobile platform in the two positions is at a known spatial relationship to the mobile device when the mobile device is placed within the first positioning area, thereby enabling to obtain an initial orientation of the mobile device, wherein the location determination component is also adapted to obtain a location indication of a location associated with a cavity, and wherein during operation of the system, the mobile device is removed from the first positioning area after the orientation is obtained, moved within a cavity, and provides location information, thereby providing descriptive information of the cavity associated with real world coordinates. Within the mobile platform, the location determination component is optionally embedded within the mobile platform. Within the mobile platform, the location determination component is optionally a Real-Time Kinematic (RTK) device, a Global Navigation Satellite System (GNSS) rover device being in communication with a GNSS base device, or a Global Positioning System (GPS). Within the mobile platform, the mobile device optionally comprises a device for determining motion of the mobile device. Within the mobile platform, the device for determining motion is optionally an inertial measurement unit (IMU). Within the mobile platform, the device for determining motion is optionally used for continuously updating a location of the first component. Within the mobile platform, the mobile device optionally comprises one or more items selected from the group consisting of: a Simultaneous Localization and Mapping (SLAM) device, a radar and a Lidar. The mobile platform can further comprise one or more items selected from the group consisting of: a winch, a motor for spinning the winch, a power supply, and a computing platform comprising a display device. The mobile platform can further comprise a winch and a cable, the cable adapted to be connected on one side to the winch and on the other side to the mobile device. Within the mobile platform, the system is optionally used for mapping cavities by monitoring a location and orientation of the mobile device and associating the location with output received from the mobile device. The mobile platform can further comprise at least two wheels and a handle. An apparatus may comprise: the mobile platform; the mobile device; and the location determination component.

Yet another aspect of the disclosure is a method comprising: obtaining coordinates of at least two points along a line that is in known spatial relationship with a mobile device stably located on a mobile platform; determining orientation of the mobile device from the coordinates of the at least two locations; obtaining coordinates of a location in known spatial relationship to a cavity to be explored; inserting the mobile device into the cavity and monitoring position and orientation of the mobile device during at least part of the mobile device stay at the cavity; associating the position and orientation of the mobile device with information received from the mobile device; and generating a model of the cavity based on the position and orientation of the mobile device and the information received from the mobile device. Within the method, the coordinates of the at least two points are optionally obtained by placing a location determination member on a positioning member connected in at least two positions to the mobile device, wherein each of the at least two points corresponds to one of the at least two positions. Within the method, the information received from the mobile device optionally comprises point clouds or captured images.

BRIEF DESCRIPTION OF THE SEVERAL VIEWS OF THE DRAWINGS

Exemplary embodiments are illustrated in referenced figures. Dimensions of components and features shown in the figures are generally chosen for convenience and clarity of presentation and are not necessarily shown to scale. It is intended that the embodiments and figures disclosed herein are to be considered illustrative rather than restrictive. The figures are listed below.

DETAILED DESCRIPTION

Figure 1:
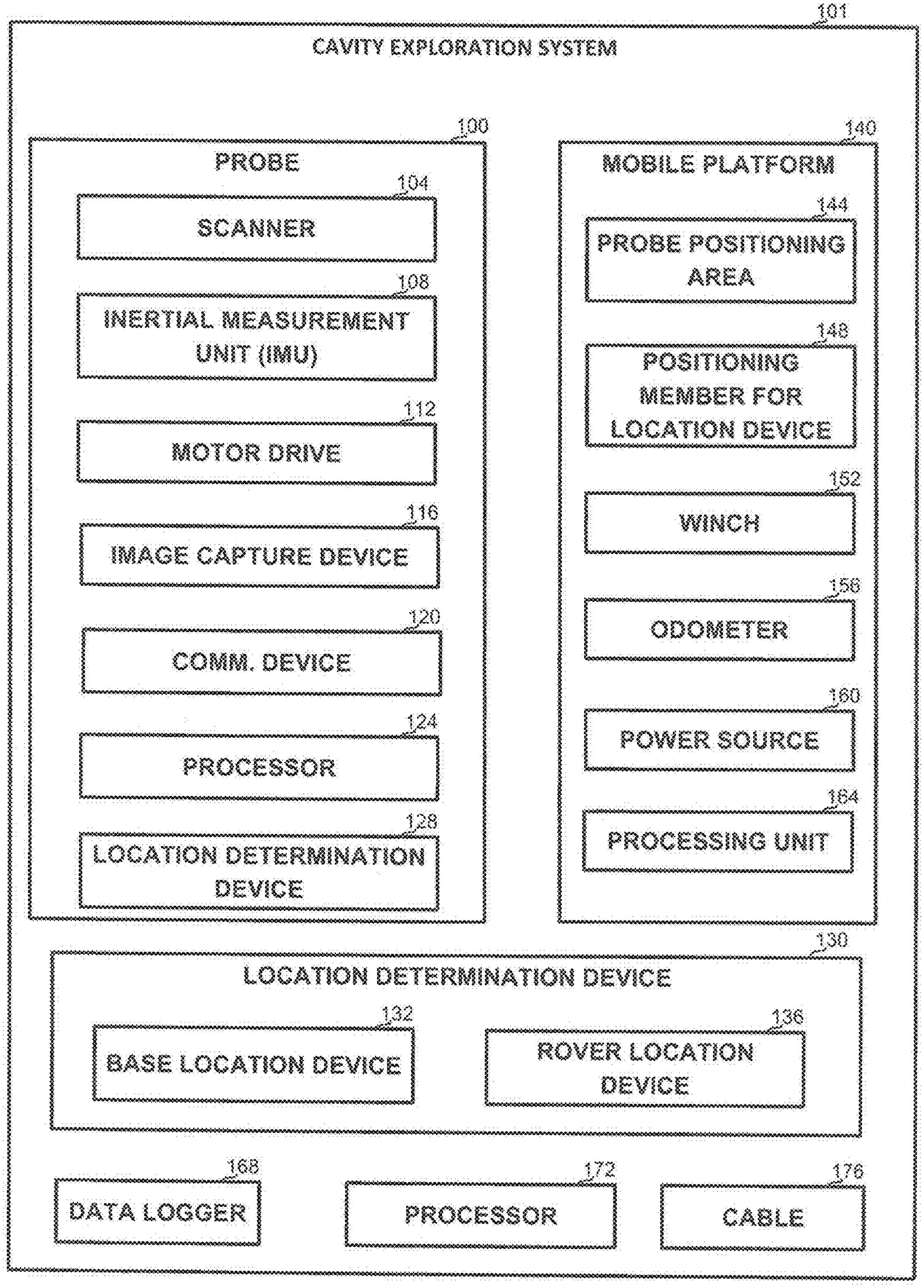
FIG. 1 is a schematic block diagram of a system for exploring cavities and in particular narrow cavities such as pits or shafts, in accordance with some exemplary embodiments of the disclosure.

The term “cavity” used in the disclosure is to be widely construed to cover any space to be scanned, explored or investigated, whether partly or fully closed, partly or fully unseen from the outside, an open area containing objects, above or below the ground, horizontal, vertical, inclined, a combination thereof, or the like.

The terms “a device providing location information”, a localization device, a position determination device, a Real-Time Kinematic (RTK) device, a Global Navigation Satellite System (GNSS) device, a Global Positioning System (GPS), or similar terms, technologies or services are used interchangeably in the disclosure, for purpose of providing accurate location. The localization device may be stand-alone, a rover device being in communication over any communication channel such as a SIM card, radio, or others, with a base station or with a base device. In some embodiments, locations may be obtained from other devices, such as manual devices, optical devices or the like.

One technical problem handled by the disclosure relates to calibration of mapping and navigation devices used within cavities or internal spaces, wherein the devices may or may not have a line of sight to satellites, and therefore may or may not use Global Navigation Satellite System (GNSS) such as Global Positioning Systems (GPS). Such cavities may include natural cavities such as caves, as well as manmade cavities such as pits, shafts, mines, tunnel systems, or others, or any combination thereof. In particular, dark and complex cavities, for example cavities comprising junctions, twisted or branched corridors, objects located within the space, or the like, may cause even an experienced navigator to lose track of where they are in the complex, what areas have and have not been explored, how to move forward, and how to get to an exit. Another example of areas to be explored may include wrecked buildings or objects, such as buildings collapsed due to earthquakes or other reasons.

GPS reception may be available in some part of these areas, while in others it may not. Either way, it may be required to move within the spaces looking for survivors. Naturally, no mapping exists for such structures in their demolished state, while on the other hand, time is of essence and it is required to act fast and scan the cavities efficiently.

Yet another technical problem relates to associating locations within the cavity with real world coordinates. Such technical problem may arise, for example, when it is required to drill from the surface into a cavity such as a mine or a tunnel, in order to access a specific area thereof. Digging in the wrong location may lead to a dead end within the cavity, a wall, a dangerous area, or the like. Some activities may require a combined map, which comprises over-ground and underground data of an area, for example showing the projection of the space relatively to surface objects in the area, such as houses. This structure may be used to determine existing access ways to the underground cavities, for planning activities in the area, or planning new access ways. One particular use relates to mapping of a structure, such as a building, a bridge, a wall, or the like, wherein said mapping comprise absolute coordinates. Yet another situation is when a cavity explorer needs to find an entry or an exit to or from the cavity, but also needs to know where the entry or exit are in the real world, for example in order to coordinate a ride.

The discussion below uses interchangeably the terms “cavity”, “area”, “non-exposed area” and “internal space” to relate to areas, wherein locations within the area may or may not have line of sight to satellites or other devices, and wherein the locations are underground or above ground.

One technical solution comprises a system including a mobile device. The mobile device may be elongated such that it can be inserted into narrow pits or shafts. The term mobile device and the "probe" are used interchangeably. The mobile device may be handheld, or otherwise maneuvered. For example, the mobile device may be lowered into a pit or tunnel while being connected to a cable. Once the operation is done, the mobile device may be pulled back by retreating the cable.

The mobile device may comprise a scanner for mapping cavities, such as a localization and mapping device and in particular Simultaneous Localization and Mapping (SLAM) device. In some embodiments, the SLAM device may generate a cloud of points, for example 40,000 points per second, which provide a three dimensional outline of the part of the cavity and the objects therein to which there is a line of sight.

The mobile device may further comprise capture devices such as a camera, a video camera, a thermal camera, or the like.

The mobile device may further comprise an inertial measurement unit (IMU) for analyzing the route the user is traversing within the cavity and determining relative locations within the cavity.

The solution may further comprise a dynamic platform, also referred to as a mobile platform, for carrying the mapping system including the probe, wherein the platform may be moved to any desired location, for example using wheels or otherwise carried around.

The dynamic platform may comprise a first member, recess or any other location, for stably placing the mobile device thereon in a predetermined position, such that the mobile device does not accidentally move relative to the mobile platform, for example, during a calibration operation.

The dynamic platform may comprise a second member for stably positioning a location determination device, such as a GPS device, or a rover member of a GNSS system, while the base member of the GNSS system may be located elsewhere, for example at or near the mobile platform, at or near the entrance to the cavity, or at another location having a line of sight to satellites.

The second member may be connectable to the mobile platform on at least two locations thereof. At each location, a location determination device, such as a rover location device may be stably located on the second member, and its coordinates may be obtained. Thus, a direction of a line connecting the two locations may be obtained.

A long axis of the first member and hence of the mobile device, and the line between the two locations may be at known spatial relationship to each other, in a non-limiting example parallel to each other. Thus, by obtaining the coordinates at two locations of the second member, the orientation of the first member and hence of the mobile device positioned therein may be calculated.

Additionally or alternatively, in some embodiments, one or more location determination devices may be installed within the mobile device, such that the mobile device can detect its own orientation independently or in collaboration with another unit, as with the GNSS implementation mentioned above.

Further coordinates may be taken at other locations, for example at an opening of a pit or shaft of to the cavity, at the entrance to the cavity, or the like. Thus, by tracking the location and orientation of the mobile device starting at the mobile platform and using the IMU, and combining the same with the coordinates of the entrance to the shaft, the location and orientation of the mobile device may be obtained throughout the operation, such that any data, such as a point in the point cloud or images provided by the mobile device may be associated with accurate coordinates.

The dynamic platform may comprise a mechanism for moving a cable connected to the mobile device into and out of a cavity, for example advancing and retreating the cable. In some embodiments, the mechanism may be a winch, wherein a cable is connected on one end to the winch, and on the other end to the mobile device, such that the cable can be used to lower the mobile device into a pit and pull it back. The dynamic platform may also comprise a second mechanism, such as an odometer, for measuring the amount of the cable released and retreated, which may be used as an auxiliary measure for determining the location and in particular the depth of the mobile device.

The dynamic platform may also comprise a motor for maneuvering the cable, a power source, a computing platform and/or additional components.

Once the initial coordinates and orientation have been obtained, the mobile device may be inserted into the cavity. For example, the mobile device may be advanced into a pit or tunnel while being connected to the cable which is released from the winch. Once the operation is done, the mobile device may be returned by retreating the cable into the winch.

Starting at the entrance location to the pit, and throughout its operation, the position and orientation of the mobile device can be calculated continuously using the initial orientation, an initial location such as the entrance to the pit, and the output from the IMU device installed on the moving device.

In some examples, the mobile device can provide a point cloud from which the description of the space it is within may be obtained. Additionally or alternatively, the mobile device can comprise a capture device such as a camera, a video camera, a thermal camera, or the like, and may provide images of its environment, either continuously or upon an instruction from a user.

The mobile device may provide the captured information, such as the point cloud or the captured images to one or more computing platforms. In some embodiments, the data may be stored in a storage device within the mobile platform and downloaded at a later time, for example when the mobile device is pulled back. In another example, the captured information may be transmitted to another computing device or storage device over a wire adjacent to the cable, over wireless communication, or the like.

The areas the mobile device is at, such as the pit, shaft, tunnel or others, and any areas within the field of view of one or more devices embedded within the mobile device may then be mapped using the output from the scanner and/or capture device, and the location and orientation.

The mobile platform may comprise an area, for example a planar and slightly inclined area on which a computing platform such as a laptop may be located comfortably, wherein the computing platform may display the data as received from the mobile device with or without further processing, to a user. The user may provide instructions to the mobile device by using a user interface of a program executed by the computing platform, wherein the instructions may be provided to the mobile device through the cable.

One technical effect of the disclosure provides for static calibration using a dynamic platform, by statistically determining the location and orientation of a mobile device positioned on a dynamic platform transported to a required location. This effect is enabled by a mobile platform comprising a member or recess for stably positioning the mobile device, such that when the mobile platform is static, the orientation of the mobile device can be obtained accurately. The orientation and the position of the mobile device may then be monitored throughout the operation of the mobile device, such that information obtained by the mobile device may be associated with accurate coordinates.

Another technical effect of the disclosure provides for the mobile platform containing a winch connected to a cable, such that the mobile device can be lowered into a pit or shaft, or advanced into any other cavity and brough back. A conductor such as an electrical wire or an optic fiber may also be used for providing instructions to the mobile device and receiving information such as mapping information or images of the cavity from the mobile device. Measuring the length of the cable released or retreated may be used for obtaining further accurate location of the device.

The disclosure thus provides for mapping a cavity, wherein any area of the cavity is associated with real world coordinates. For example, a probe may be dropped into a vertical pit, capture images and obtain a mapping of a cavity or a branch of the pit, and obtain exact coordinates of a desired point within the cavity or along the branch, such that the probe may be pulled up and lowered again from an area above the desired point, reach the desired point, and continue mapping the cavity or take any other action.

Referring now to FIG. 1, showing a schematic block diagram of a system for exploring cavities and in particular narrow cavities such as pits or shafts, in accordance with some exemplary embodiments of the disclosure.

The system may comprise a probe 100, a location determination device 130, a mobile platform 140, and a computing platform 172.

It is appreciated that one or more location determination devices 130, computing platforms 172 or additional components may be embedded within and constitute part of probe 100, and/or of mobile platform 140. For example, computing platform 172 may be a laptop or another computing platform positioned on an inclined area of mobile platform 140.

"Probe 100 may comprise a scanner 104, which may be a SLAM device for obtaining the structure of a cavity or space the probe is in. The SLAM device can use the point cloud technique to depict objects in its vicinity, including for example walls, corridors, openings, stairs, floor, pits, ceilings, and portable and non-portable objects within the cavity. One example of such device is GeoSLAM® by Bingham, Nottinghamshire, UK. The SLAM device may scatter a multiplicity of laser beams, for example at least 40,000 beams per second each hitting the nearest object in its direction, receive the returned signals, compute the distance to the object in that direction, and thereby obtain a model of the area".

Probe 100 may comprise an IMU 108. Scanner 104 and IMU 108 may be functionally, electronically and/or mechanically coupled, and in some embodiments, IMU 108 may be embedded within scanner 104. In some embodiments, probe 100 may comprise a first IMU 108, and a second IMU (not shown) embedded within scanner 104.

IMU 108 may be any motion sensor, for example an accelerometer, a gyroscope, or the like. Upon analysis of the measures provided by IMU 108, the advancement of the probe within the cavity may be assessed and combined with the measures taken by scanner 104, to provide the probe's location at any given time relative to the cavity structure.

Probe 100 may comprise a motor drive 112 for rotating scanner 104 such that the point cloud is distributed in all directions around scanner 104 and is not limited to certain directions. Scanner 104 may be rotated continuously by motor drive 112, and as it is being rotated and also moved due to the movement of probe 100, the area is continuously mapped and a model of the traversed area may be constructed based on the point cloud.

Probe 100 may further comprise image capture device 116, such as a camera, a video camera, a thermal camera, a GoPro® camera, or the like.

Probe 100 may further comprise communication device 120, such as a device providing wired communication through the cable, wireless communication, or the like.

Probe 100 may comprise processor 124 for processing and integrating the scanning results. Processor 124 may be embedded within scanner 104 or IMU 108. In other embodiments, processor 124 may be external to scanner 104 and IMU 108, and may receive and integrate further information such as images. In further embodiments, processor 124 may be implemented as two or more processors, for example one or more processors within scanner 104, and one or more additional processors for integrating the readings with additional data such as relative or absolute coordinates, building a model of the cavity, or the like.

In some embodiments, probe 100 may comprise location determination device 128 such as a GPS or a GNSS rover, which is useful in determining the location of probe 100 independently, or for example, by communicating with a GNSS base. If probe 100 has a line of sight to satellites, for example when positioned on mobile platform 140, the absolute location may be obtained with high accuracy.

In some embodiments, probe 100 may comprise additional sensors, such as a thermometer, a gas detector, an explosive sensor, or the like.

Mobile platform 140 may be a dynamic portable platform designed to carry equipment across locations, and may thus comprise wheels, or other moving elements.

In some embodiments, mobile platform 140 may comprise an engine for steering the platform. In some embodiments, mobile platform 140 may comprise one or more handles or other members for a user to manually maneuver mobile platform 140 to a desired location.

Mobile platform 140 may comprise a probe positioning area 144 for stably positioning mobile device 100 therein. Probe positioning area 144 may be a recess, a ditch or another arrangement designed to hold the mobile device stably without moving at a predetermined position.

Mobile platform 140 may comprise a positioning member for location device 148 for placing thereon a location determination device 136 such as rover location device.

Figure 2A:
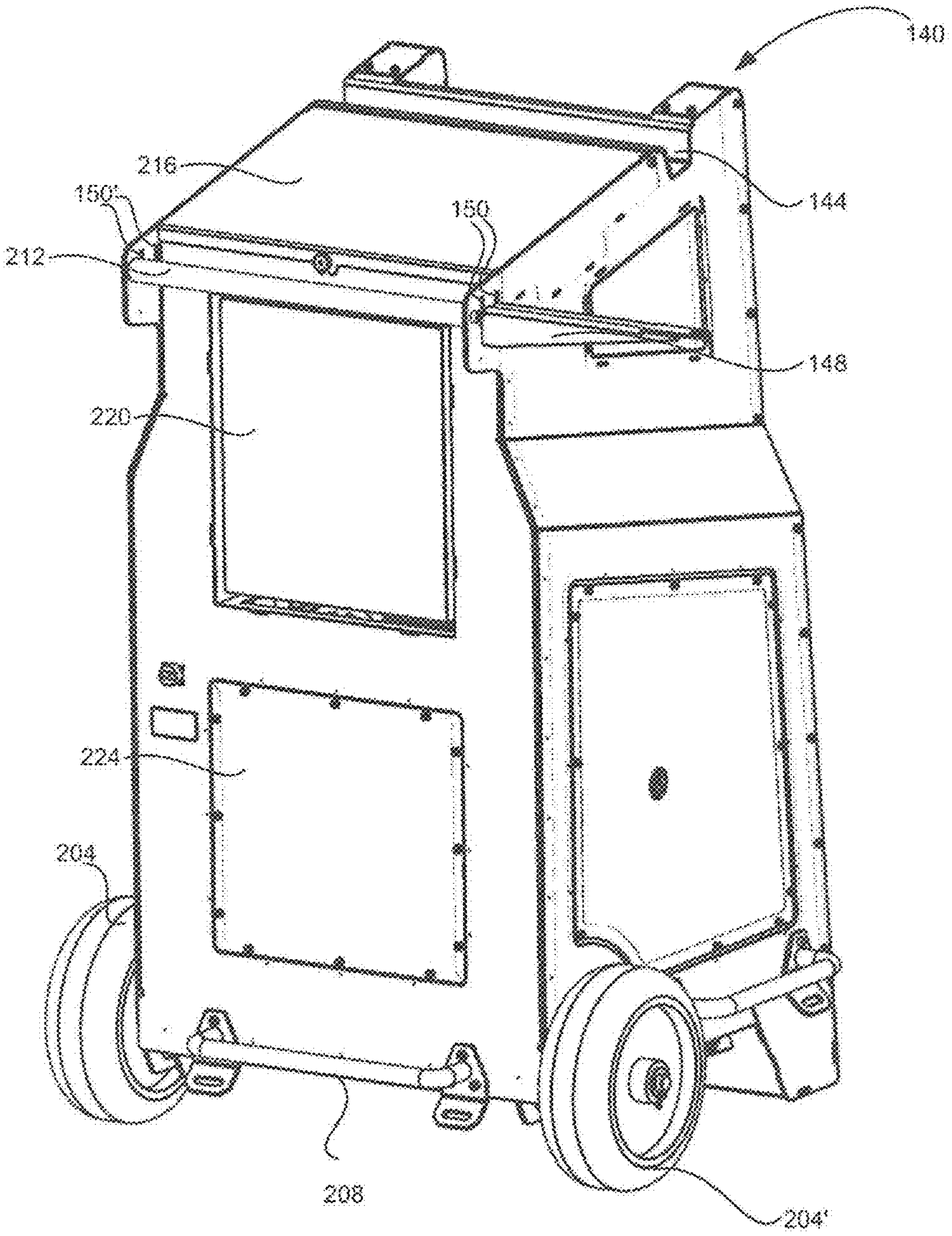
FIG. 2A is a front isometric view of a mobile platform, in accordance with some exemplary embodiments of the disclosure.
Figure 2B:
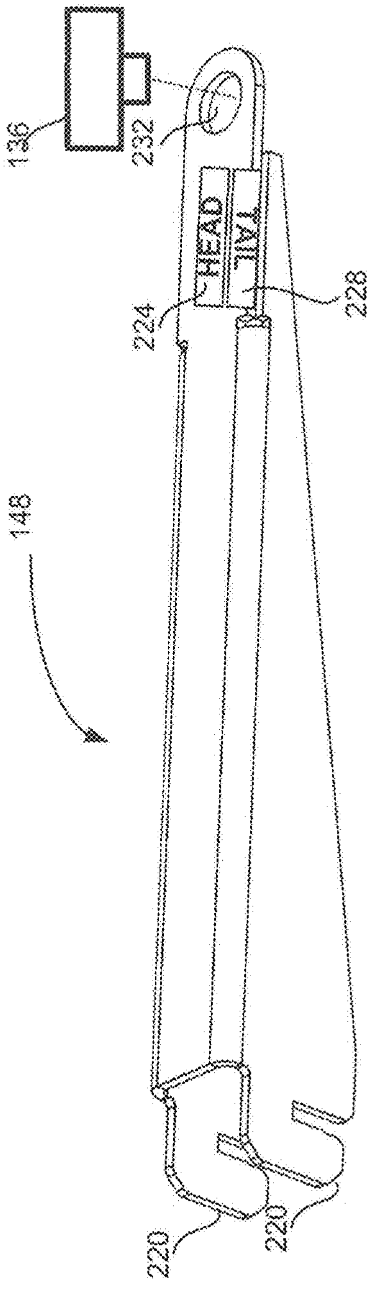
FIG. 2B is a perspective view of a positioning member for location device, in accordance with some exemplary embodiments of the disclosure.

Referring now also to FIG. 2B, showing a perspective view of the positioning member for location device, in accordance with some exemplary embodiments of the disclosure.

Positioning member for location device 148 may be designed as an elongated member, configured to receive and hold stably in a known position rover location device 136 or another location determination device and, so as to enable to determine the exact orientation of probe 100.

Positioning member for location device 148 may have thereon hooks 220 designed to be inserted into openings 150 and 150' on either side of mobile device 140. Positioning member for location device 148 may comprise opening 232, or another connection or mounting member, into which a location determination device may be inserted or coupled. Positioning member for location device 148 and openings 150, 150' are designed such that the line connecting the center of opening 232 when positioning member for location device 148 is coupled to mobile device 140 on its right hand side and the center of opening 232 when positioning member for location device 148 is coupled to mobile device 140 on its left hand side, using openings 150', is at known spatial relationship, for example parallel to the direction of the long axis of probe positioning area 144 and hence of probe 100. It is appreciated that while the directions of the line connecting the two positions of opening 232 and the of probe positioning area 144 may not necessarily be parallel, parallel directions may make the computation of the direction of probe positioning area 144 (and hence the starting point of probe 100) easier.

Positioning member for location device 148 may comprise two inscriptions or texts 224, 228 attached thereto. Text 224 may read "Head" or a similar term and may be positioned in easy-to-read upright direction when positioning member for location device 148 is coupled to mobile device 140 on the right hand side of mobile device 140, and text 228 may read "Tail" or a similar term and may be positioned in upright direction when positioning member for location device 148 is coupled to mobile device 140 on the left hand side of mobile device 140. These placements correspond to probe 100 being placed in probe positioning area 144 with its head to the right hand side of mobile device 140.

It is understood, however, that the placement direction of probe 100 can be reversed, and inscriptions 224, 228 may be swapped or even omitted, as long as it is known which side corresponds to the head of probe 100 and which to the tail.

Positioning member for location device 148 being implemented as a separate unit which may be attached to or mounted on mobile platform 140 when mobile platform 140 arrives at the location where the system is to be operated, provides for more compact and less vulnerable shape during transition. This arrangement enables positioning member for location device 148 to protrude from mobile platform 140 only during calibration, thus minimizing breaking risk.

Mobile platform 140 may comprise a mechanism for releasing and retreating a cable, such as a winch 152.

Mobile platform 140 may comprise an odometer 156 for measuring the amount of cable that has been released, and thus the distance of mobile device 100 from mobile platform 140, which may be equal to or aid in the calculation of the depth of a pit into which mobile device 100 has been inserted.

Mobile platform 140 may comprise power source 160, such as a battery, a rechargeable battery, a generator, a renewable power source, or the like. Power source 160 may be used for operating the winch, the odometer, one or more processing units, and any other need.

Mobile platform 140 may comprise one or more processing units 164 for receiving data, for example from mobile device 100, integrating data, or the like.

In some embodiments, the system may comprise location determination device 130, which may be a single device such as a GPS device. In other embodiments, location determination device 130 may comprise a base location device 132 such as a GNSS base, and a rover location device 136, such as a GNSS rover. During operation, the single device, or the rover device, depending on the implementation, may be located at two different locations on positioning member for location device 148, to obtain its orientation, which then provides the orientation of probe 100 during calibration.

The system may further comprise a data logger 168, which may be a storage device, and store for example information, coordinates and point clouds or images, received from mobile device 100.

The system may further comprise a computing platform 172 for receiving data, calculating models of the cavity, or the like.

The system may also comprise a cable 176, which may connect on one end to winch 152 and on the other end to mobile device 100, such that mobile device 100 can be lowered into a pit or shaft, provide information such as images of the shaft and of tunnels or other spaces connected to the pit or shaft, and pulled back.

Referring now to FIG. 2, showing a front isometric view of a mobile platform, in accordance with some exemplary embodiments of the disclosure.

Mobile platform 140 may be made of plastic, wood, metal, or the like.

Mobile platform 140 may be equipped with two wheels 204 and 204', a foot rail 208 and a handle 212. A user can step on foot rail 208 and tilt mobile platform 140 towards the user, such that mobile platform 140 can be maneuvered on wheels 204 and 204' by the user pushing mobile platform 140 by handle 212.

Mobile platform 140 may comprise a recess or any other form of probe positioning area 144 in which probe 100 may be placed stably such that it does not unintentionally move during calibration.

Mobile platform 104 may further comprise positioning member for location device 148 on which a location determination device 130 or 136 may be placed. In some embodiments positioning member for location device 148 may be removed when mobile platform 140 is not in use, and connected to mobile device 140 when required. Positioning member for location device 148 may be attached to mobile platform 140 using a locking mechanism, one or more hooks, one or more screws, or the like.

Mobile platform 104 may further comprise a surface 216, which may be flat and may be inclined, such that a user can place a computing platform comprising processor 172, such as a laptop computer on surface 216, and comfortably view the display of the computing platform. The display may present, for example, a model of the cavity which mobile probe 100 is inserted into, a point cloud obtained by SLAM device of mobile probe 100, one or more images taken by a capture device of mobile probe 100, or the like.

Mobile platform 140 may also comprise an internal volume which may be divided into one or more compartments, such as compartments 220 and 224, which may or may not be covered.

Figure 3:
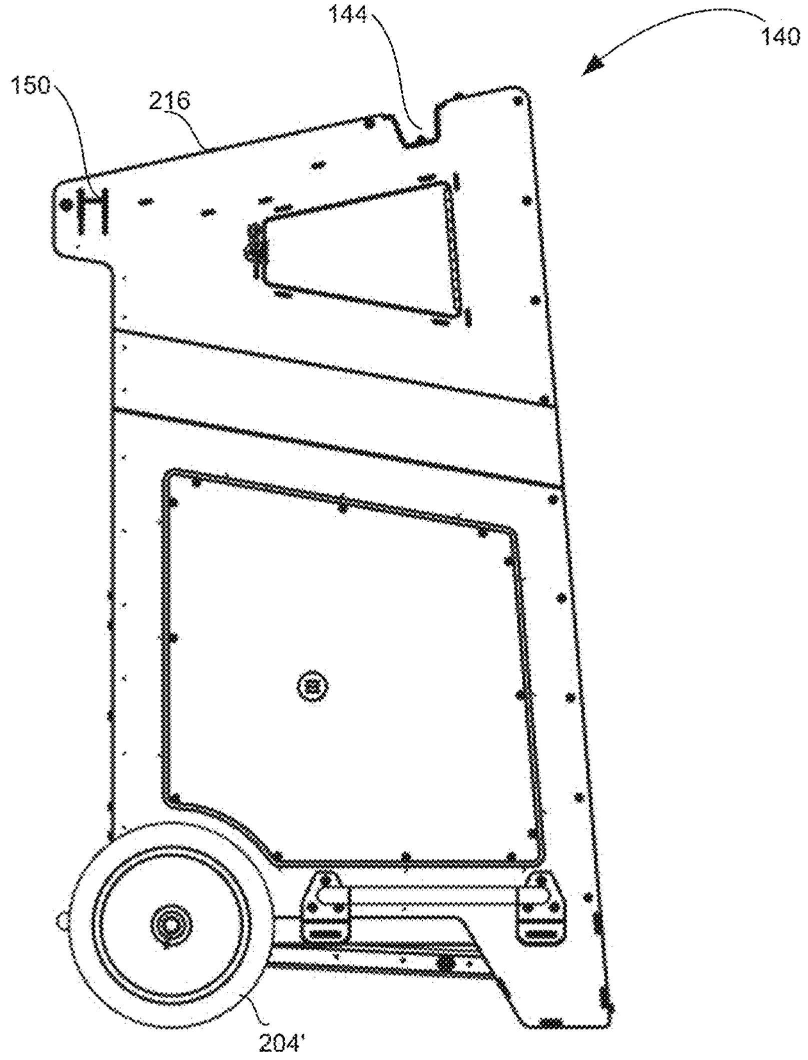
FIG. 3 is a side view of a mobile platform, in accordance with some exemplary embodiments of the disclosure.

Referring now to FIG. 3, showing a side view of mobile platform 140, in accordance with some exemplary embodiments of the disclosure.

FIG. 3 shows mobile platform 104, recess 144 in which mobile device 100 may be placed for calibration, and surface 216 upon which a laptop may be placed such that a user may view information captured by mobile device 100 and provide instructions to mobile device 100.

Mobile platform 140 may also comprise a lock, an opening 150 or any other attachment mechanism for attaching positioning member for location device 148 to mobile platform 140.

Figure 4:
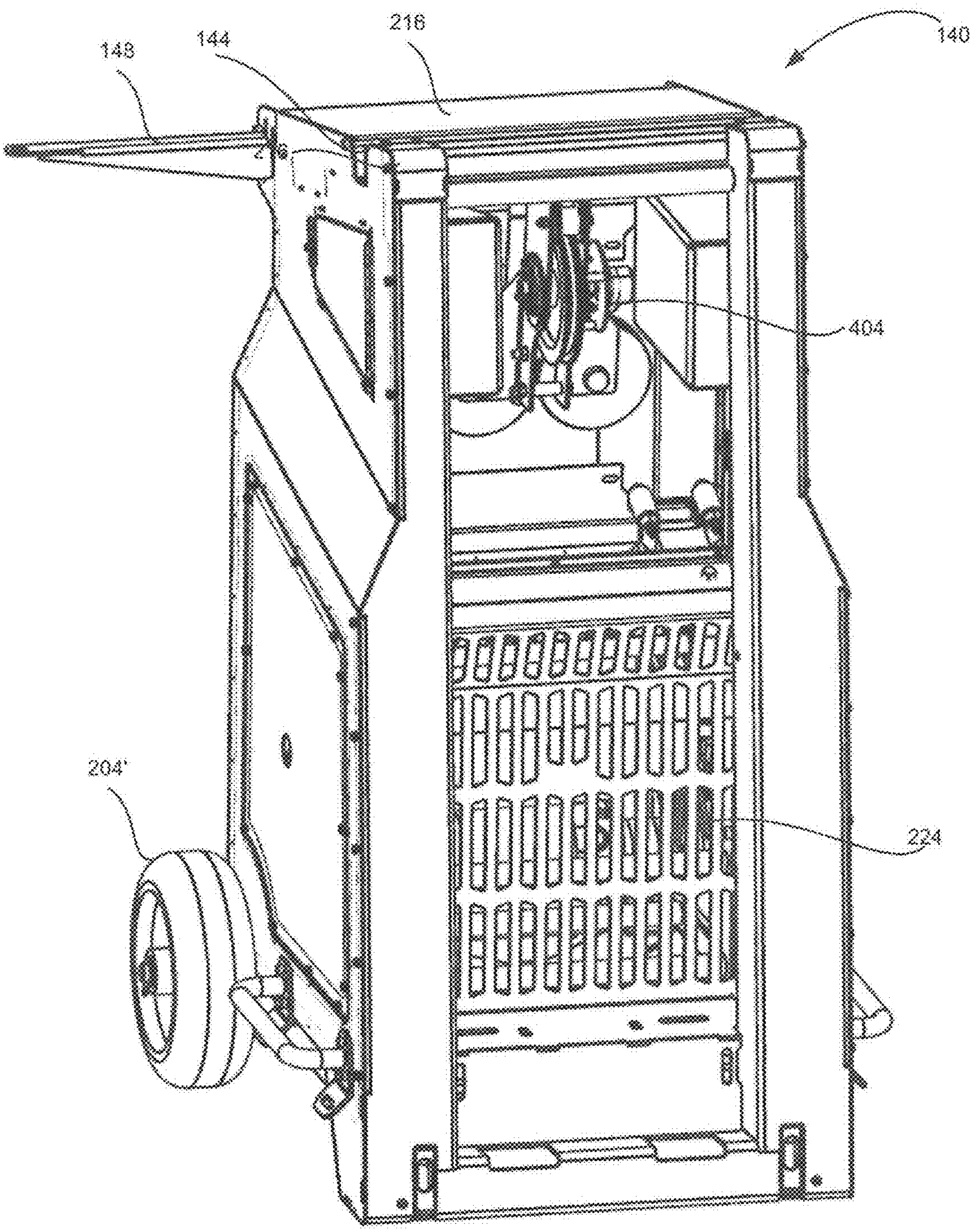
FIG. 4 is an isometric view of a mobile platform, in accordance with some exemplary embodiments of the disclosure.

Referring now to FIG. 4, showing an isometric view of a mobile platform 140, in accordance with some exemplary embodiments of the disclosure.

In addition to probe positioning area 144, positioning member for location device 148 and surface 216, FIG. 4 further shows winch 404, upon which a cable may be spun and released. Mobile platform 140 may further comprise a motor (not shown) for releasing and retreating winch 404.

Mobile platform 140 may also comprise additional components of the system stored for example within compartment 224, such as a power supply, cables, additional processing units, or the like.

Figure 5A:
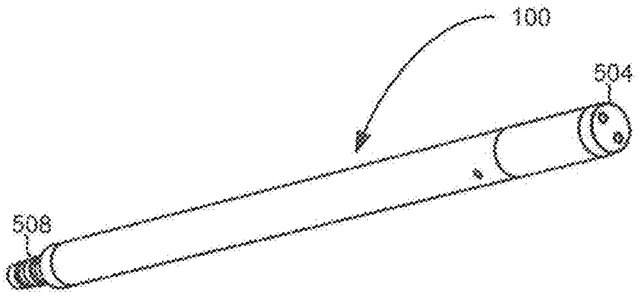
FIG. 5A is an isometric view of a probe, in accordance with some exemplary embodiments of the disclosure.

Referring now to FIG. 5A, showing an isometric view of a probe, in accordance with some exemplary embodiments of the disclosure.

Probe 100 is substantially elongated, such that it can be inserted into narrow cavities, such as pts or boreholes. Probe 100 has a front end 504, also referred to as head where one or more of the capture devices, such as scanner 104 or image capture device 116, may be installed. Thus, probe 100 may be able to capture as much data as possible from its environment. Probe 100 may also have a rear end 508, also referred to as tail, adapted for example to connect to cable 176, such that it can be lowered into a pit and pulled back.

Figure 5B:
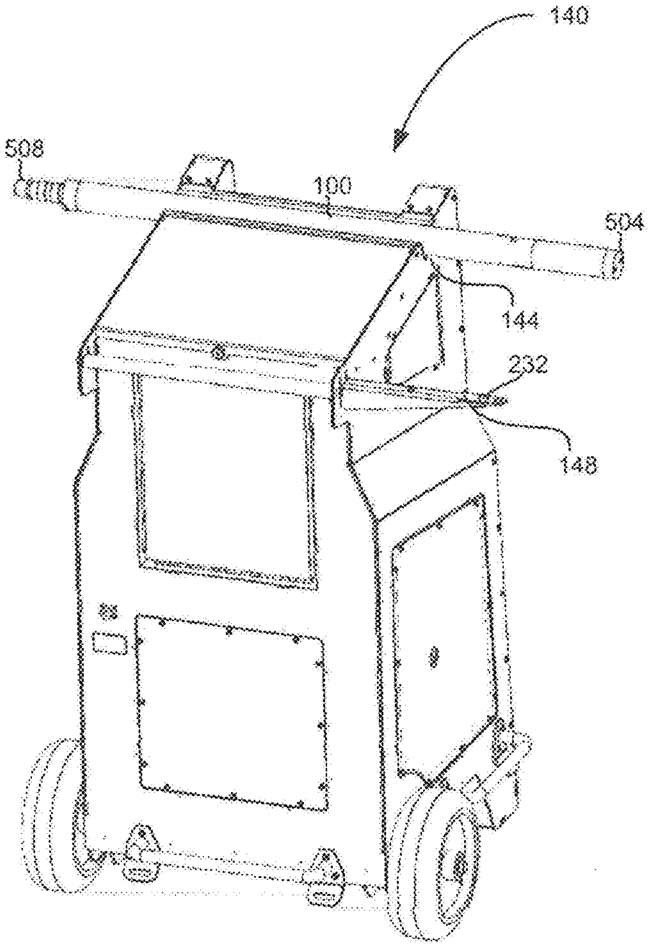
FIG. 5B is an isometric view of a mobile platform 140 with a probe, in accordance with some exemplary embodiments of the disclosure.

Referring now to FIG. 5B, showing mobile platform 140 with probe 100, in accordance with some exemplary embodiments of the disclosure.

For the calibration procedure, probe 100 may be stably located within probe positioning area 144. During calibration, location determination device such as a GPS device or rover location device 136 may be placed on positioning member for location device 148, for example in opening 232, and obtain its coordinates, such as real-world coordinates.

Location determination device such as a GPS device or rover location device 136 may be placed on positioning member for location device 148, for example in opening 232, and obtain its coordinates, such as real-world coordinates.

Positioning member for location device 148 may then be connected to the other side of mobile platform 140, and the updated coordinates of opening 232 may be obtained.

Based on the difference between the coordinates, the orientation of positioning member for location device 148 and hence of probe 100 may be obtained. Although the long axis of probe 100 and positioning member for location device 148 are shown as being parallel, it is understood that this is optional, and any other spatial relationship therebetween may exist and be used for determining the orientation of probe 100.

It is appreciated that mobile platform 140 as shown is exemplary only, and that other embodiments may be provided. For example, mobile platform 140 may be implemented as a carriable package such as a backpack, comprising the detailed components, and which may be placed stably, such that when positioning member for location device is connected to and disconnected therefrom on both sides, the probe placed in probe positioning area does not move. In such implementation, shorter or lighter cables may be used than when the mobile platform is as shown in FIGS. 2A and 3-5 above.

FIGS. 5C-5F show some views of a stand, wherein the probe may be calibrated when stably put on two such stands, in accordance with some exemplary embodiments of the disclosure.

Figure 5C:
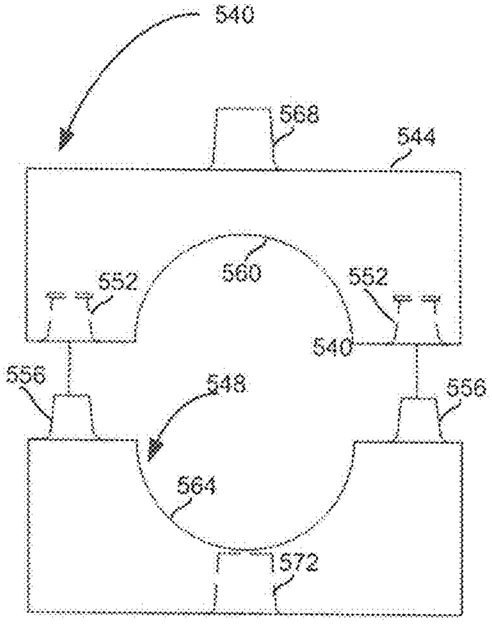
FIGS. 5C-5F show some views of a stand, wherein the probe may be calibrated using two such stands, in accordance with some exemplary embodiments of the disclosure.
Figure 5D:
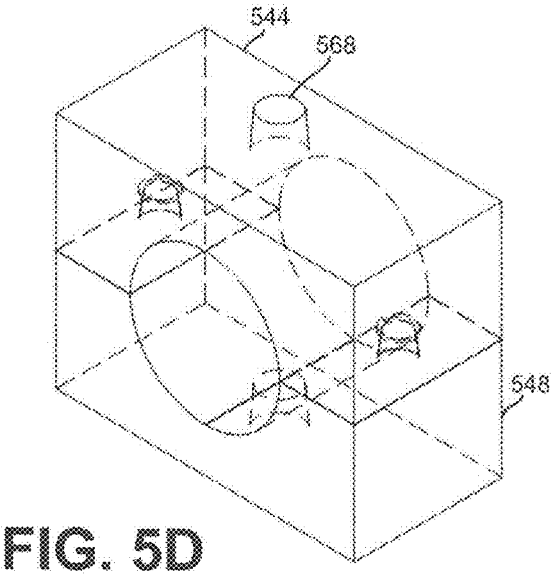
Figure 5E:
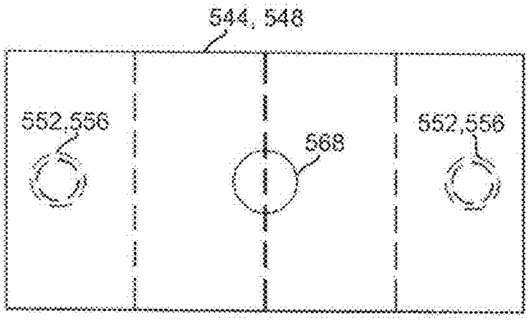
Figure 5F:
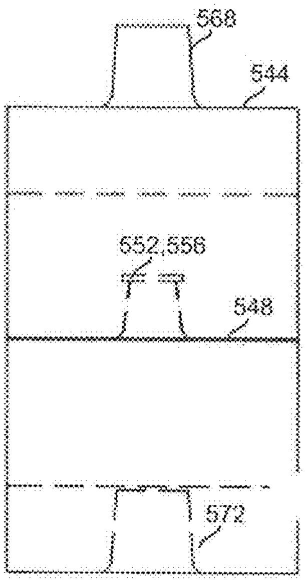

FIG. 5C shows a side view of top part 544 and bottom part 548 of stand 540. FIGS. 5D, 5E and 5F show a perspective view, a top view and a side view, respectively, of stand 540 comprised of top part 544 being mounted over bottom part 548.

In some embodiments, bottom member 548 may have one, two or more protrusions 556 and top member 544 may have hollows 552 in corresponding locations to protrusions 556.

Top member 544 may have at its bottom part a longitudinal cavity 560, shaped for example as a half of a cylinder. Bottom member 548 has at its top part a longitudinal cavity 564, also shaped for example as a half of a cylinder, such that when top member 544 is mounted over bottom member 568, protrusions 556 are inserted into hollows 552, and the two half-cylinders 560 and 564 form a cylindrical hollow, corresponding to the perimeter of probe 100 and thus adapted to stably accommodate receive probe 100.

Top member 544 may also have a protrusion 568 adapted to be inserted into a corresponding hollow in a location determination device, such as location determination device 130 or rover 136. Bottom part 548 may have a hollow 572 adapted to receive protrusion 568, thus enabling efficient packing of the two parts of stand 540 when not in use.

When required to calibrate, two bottom members 548 may be placed on a plane, at a distance that is slightly smaller, for example 10 cm or 10% smaller than the length of the probe. For example, if the probe is about 1 m long, bottom members 540 may be placed about 90 cm apart.

Figure 5G:
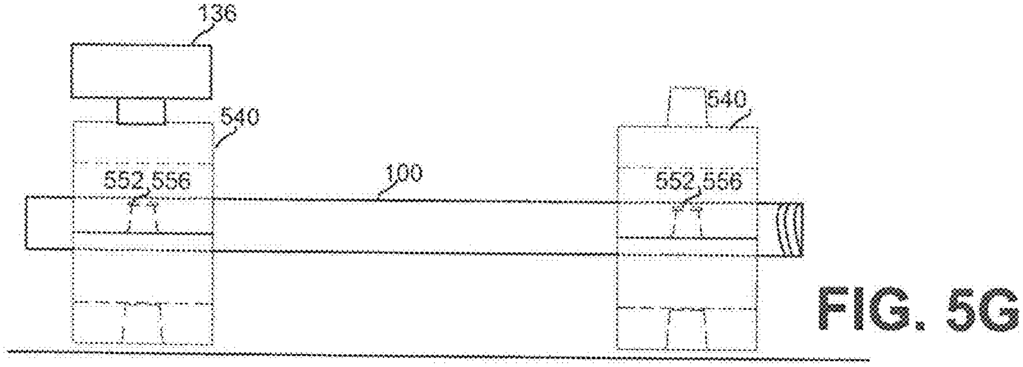
FIG. 5G shows a schematic view of two stands and a probe being calibrated, in accordance with some exemplary embodiments of the disclosure.

Referring now to FIG. 5G, showing two stands 540, and probe 100 during calibration, in accordance with some exemplary embodiments of the disclosure.

Two bottom parts 548 are placed on a plane, such that the long axes of their longitudinal half-cylindrical cavities are on the same line, and at a distance that is slightly shorter than the length of probe 100, for example 10% or 10 cm shorter. Probe 100 may then be placed in the half-cylindrical cavities of bottom parts 548 such that each bottom member 548 is close to one of the ends of probe 100.

Top members 544 may then be mounted over bottom parts 548 and above probe 100, such that hollows 552 of each top member 544 receive protrusions 556 of the corresponding bottom member 548.

Location determination device 130 or 136 may then be placed over protrusion 568 of one of top members 544, and its location in world coordinates may be obtained. Once the coordinates have been obtained, location determination device 130 or 136 may be placed over protrusion 568 of the other top member 544, and its location in world coordinates may be obtained as well. As detailed above, the orientation of probe 100 may then be obtained based on the two obtained locations.

It is appreciated that other embodiments may be designed in a similar manner, for example a single longer stand having protrusions on which location determination device 130 can be set at two positions that are far enough from each other to enable accurate positioning. However, having two stands provides for more compact packaging and/or a longer distance between the two locations.

It is appreciated that an apparatus comprising the mobile platform, the probe an the location determination device may be provided, which is carriable for example in one or more backpacks an dis thus easy to transport and use.

Figure 6:
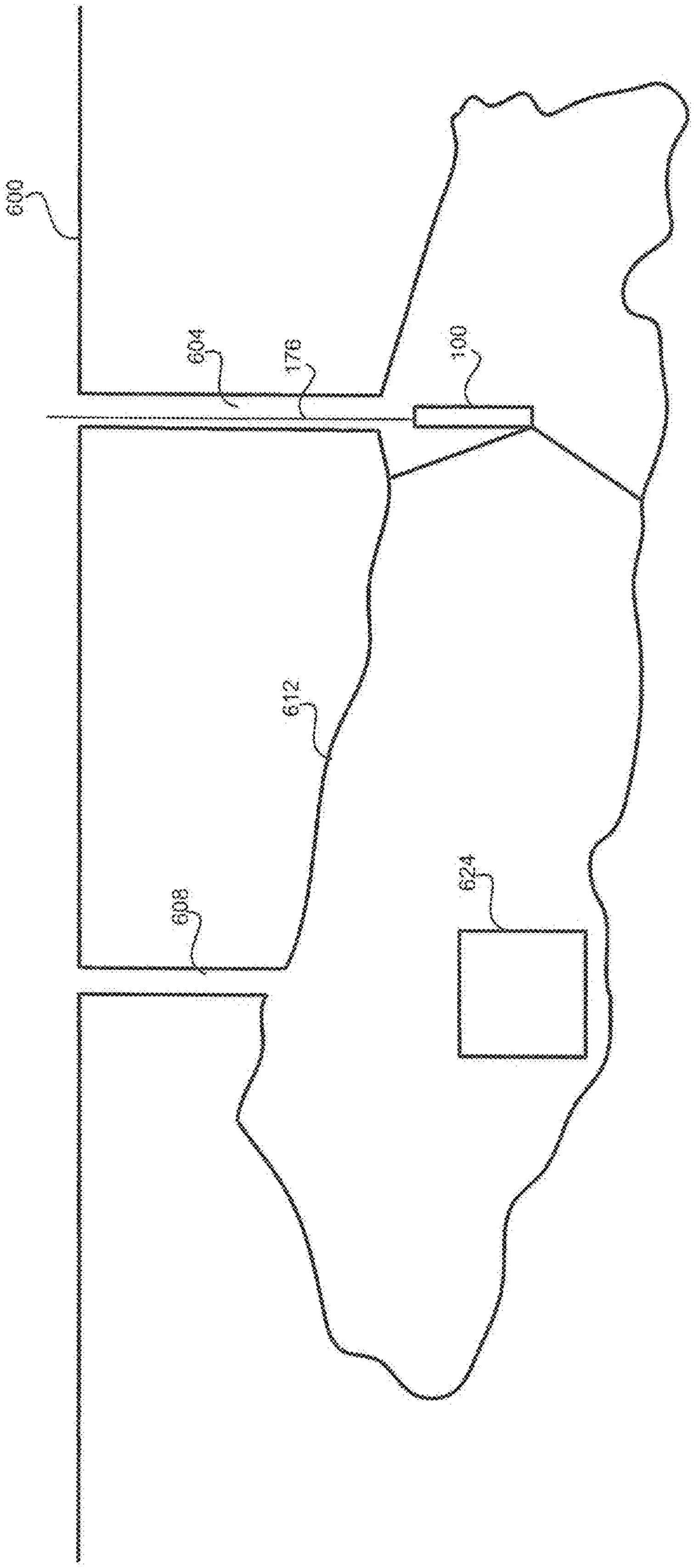
FIG. 6 is an illustration of a vertical cross section of a tunnel and boreholes through which a probe can be inserted, in accordance with some exemplary embodiments of the disclosure.

Referring now to FIG. 6, showing an illustration of a vertical cross section of a tunnel and a borehole through which a probe is inserted, in accordance with some exemplary embodiments of the disclosure.

FIG. 6 shows a first pit 604 and a second pit 608, starting at ground level 500 and opening into cavity 612. The point clouds provided by mobile device 100 when being lowered through pits 604 and 608, and into cavity 612 may be processed and a model of the cavity and pits may be created. The entry point at the ground level of an opening of at least one pit is associated with accurately measured coordinates, and these coordinates together with the orientation of the mobile device as initially obtained when the mobile device was positioned on the mobile platform, and then monitored continuously during its operation, may be used for creating an accurate model of the cavity, wherein each point is associated with real world coordinates.

In another use case, a probe 100 may be dropped along cable 176 into a vertical peer such as pit 604, and obtain a mapping of the part of cavity 612 within its field of view, which may be 3600 or less, including object of interest 624, whose accurate coordinates can be determined. The probe may then be pulled back by cable 176, and re-inserted through pit 608 (which may be dug for this purpose once the coordinates of object 624 are known). Alternatively, another object or person may be lowered through pit 608 in order to handle or further investigate object 624.

Figure 7:
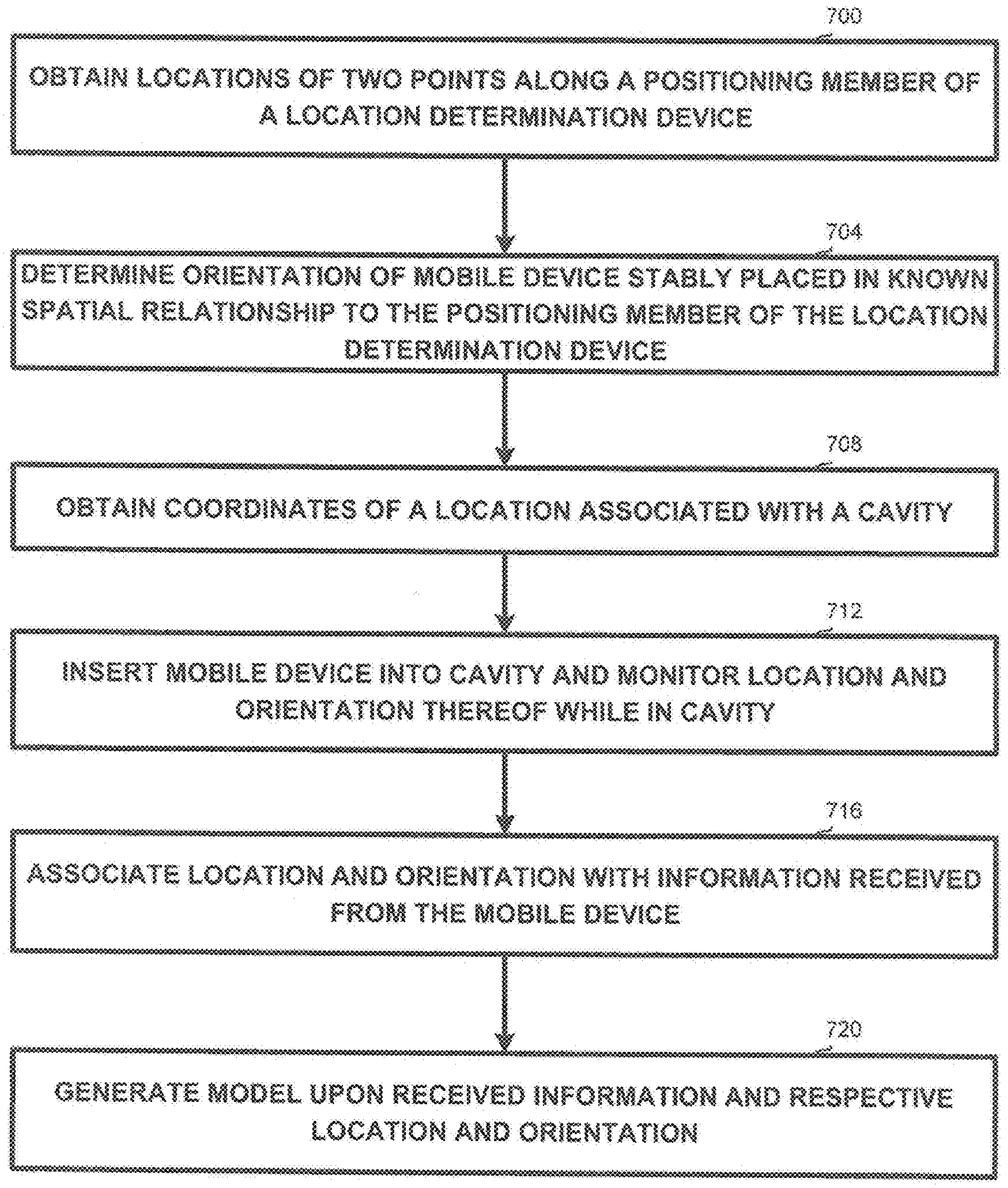
FIG. 7 is a flowchart of steps for obtaining a model of a cavity with coordinates, in accordance with some exemplary embodiments of the disclosure.

Referring now to FIG. 7, showing a flowchart of steps for obtaining a model of a cavity with coordinates, in accordance with some exemplary embodiments of the disclosure.

On step 700, the locations of two points that are along a line that is in known spatial relationship with the probe may be obtained. For example, first, a location may be obtained when a location determination device such as rover location device 136 is placed in opening 232 of positioning member for location device 148, when positioning member for location device 148 is coupled to mobile platform 140 on its right hand side, where probe 100 is positioned within probe positioning area 144 with its head to the right. Then positioning member for location device 148 may be removed and coupled to mobile platform 140 on its left hand side, the location determination device may be re-placed in opening 232, and second coordinates may be taken. The two coordinates may be fed into a user interface with the correct head/tail labeling, whether selected by a user or automatically. The two locations are along a line which may be parallel or in other known spatial relationship with the probe when the probe is stably set at probe positioning area 144.

In a different implementation, a first location may be obtained when the probe is placed over one or more stands as shown in FIG. 5G, and where a location determination device such as rover location device 136 is placed over one of the stands (or close to one end of a stand, if a single stand is used). A second location may be obtained where the location determination device is placed over the other stand (or close to the other end of the single stand). The two locations are along a line which may be parallel to the probe when the probe is stably set over one or more stands 540.

The coordinates may be obtained by a GNSS rover device 136 being in communication with a GNSS base device. In alternative embodiments, location determination device 130 implemented as a single unit may obtain the coordinates. The stable positioning allows for obtaining accurate coordinates even if the process takes a long time, for example 10 minutes to 40 minutes.

On step 704, the orientation of mobile device such as probe 100 placed stably on probe positioning area 144, which is in known spatial relationship with the line connecting the two coordinates obtained on step 700, may be obtained.

On step 708, the coordinates of yet another location associated with a cavity to be explored may be obtained. For example the coordinates of an entry to the cavity, or a point at a known distance and direction from the entrance to the cavity.

On step 712, the mobile device may be inserted into the cavity, and its orientation and location, e.g. the location of its end associated with the head, and its orientation, may be monitored during its presence within the cavity, using for example an IMU embedded therein.

On step 716, the location of the mobile device as obtained during the exploration of the cavity may be associated with information received from the mobile device, such as point cloud, images, or the like. It is appreciated that each such location may be associated with corresponding information.

On step 720, a model of the cavity, wherein at least some parts thereof are associated with accurate coordinates, may be generated. The model may be displayed to a user, for example by projecting the model, creating a cross section of the model, determining locations within the model such as locations for digging, or the like. For example, when the mobile device is lowered into a pit, its coordinates at the time the point cloud indicate that the mobile device has arrived to where the pit opens into a larger space, may indicate the height of the pit.

The steps of FIG. 7 may be performed by a computing platform, such as computing platform 172. Computing platform 172 may have installed thereon appropriate computer program, which may include a user interface component for receiving data from a user (for example but not necessarily the labeling of the head and tail coordinates provided by rover location device 136 when mounted on positioning member of location device 148 coupled on either side of mobile platform 140). The user interface component may be further useful in presenting the generated model to a user on a display device.

The figures illustrate the architecture, functionality, and operation of possible implementations of systems and devices according to various embodiments of the present disclosure. In this regard. It should also be noted that, in some alternative implementations, the functionality provided by the different components may be achieved using similar or other components, different materials or different dimensions without deviating from the principles of the disclosure.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Any combination of one or more components may be utilized.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed.

Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

What is claimed is:

1. A mobile platform for operating a system comprising at least a mobile device and a location determination component, the mobile platform comprising two or more stands, the two or more stands collectively having a hollow for stably receiving the mobile device, wherein the two or more stands are adapted to have the location determination device mounted thereon in at least two locations, thereby enabling to obtain an initial orientation of the mobile device, wherein the location determination device is also adapted to obtain a location indication of a location associated with a cavity, and wherein during operation of the system, the mobile device is removed from the hollow after the orientation is obtained, moved within a cavity, and provides location information, thereby providing descriptive information of the cavity associated with real world coordinates.

2. The mobile platform of claim 1, wherein the at least two stands comprise two stands, and wherein when operating the system, the two stands are placed such that the mobile device is placed in corresponding cavities of the two stands.

3. The mobile platform of claim 1, wherein the mobile device is a probe.

4. An apparatus comprising:

the mobile platform of claim 1;

the mobile device; and the location determination component.

5. A mobile platform for operating a system comprising at least a mobile device and a location determination component, the mobile platform comprising:

a first positioning area to receive the mobile device, such that the mobile device is stably located when placed within the first positioning area;

a positioning member comprising a connection for receiving a location determination device and connectable to the mobile platform in two positions, such that a line connecting the connection for a location determination device when the positioning member is connected to the mobile platform in the two positions is at a known spatial relationship to the mobile device when the mobile device is placed within the first positioning area, thereby enabling to obtain an initial orientation of the mobile device, wherein the location determination component is also adapted to obtain a location indication of a location associated with a cavity, and wherein during operation of the system, the mobile device is removed from the first positioning area after the orientation is obtained, moved within a cavity, and provides location information, thereby providing descriptive information of the cavity associated with real world coordinates.

6. The mobile platform of claim 4, wherein the location determination component is embedded within the mobile platform.

7. The mobile platform of claim 5, wherein the location determination component is a Real-Time Kinematic (RTK) device, a Global Navigation Satellite System (GNSS) rover device being in communication with a GNSS base device, or a Global Positioning System (GPS).

8. The mobile platform of claim 5, wherein the mobile device comprises a device for determining motion of the mobile device.

9. The mobile platform of claim 8, wherein the device for determining motion is an inertial measurement unit (IMU).

10. The mobile platform of claim 8, wherein the device for determining motion is used for continuously updating a location of the first component.

11. The mobile platform of claim 5, wherein the mobile device comprises at least one item selected from the group consisting of: a Simultaneous Localization and Mapping (SLAM) device, a radar and a Lidar.

12. The mobile platform of claim 5, further comprising at least one item selected from the group consisting of: a winch, a motor for spinning the winch, a power supply, and a computing platform comprising a display device.

13. The mobile platform of claim 5, further comprising a winch and a cable, the cable adapted to be connected on one side to the winch and on the other side to the mobile device.

14. The mobile platform of claim 5, wherein the system is used for mapping cavities by monitoring a location and orientation of the mobile device and associating the location with output received from the mobile device.

15. The mobile platform of claim 4, further comprising at least two wheels and a handle.

16. An apparatus comprising:

the mobile platform of claim 5;

the mobile device; and the location determination component.

17. A method for operating a system comprising at least a mobile device and a location determination component, the method comprising:

obtaining by a location determination device coordinates of at least two points along a geometric line that is in known spatial relationship with a mobile device stably located on a mobile platform;

determining by at least one processor orientation of the mobile device from the coordinates of the at least two locations;

obtaining by the location determination device coordinates of a location in known spatial relationship to a cavity to be explored;

while the mobile device is inside the cavity, monitoring by an inertial measurement unit, a position and orientation of the mobile device during at least part of the mobile device stay at the cavity;

associating by the at least one processor, the position and orientation of the mobile device with information received from the mobile device; and generating by at least one processor a model of the cavity based on the position and orientation of the mobile device and the information received from the mobile device.

18. The method of claim 17, wherein the coordinates of the at least two points are obtained by placing a location determination member on a positioning member connected in at least two positions to the mobile device, wherein each of the at least two points corresponds to one of the at least two positions.

19. The method of claim 17, wherein the information received from the mobile device comprises point clouds or captured images.

* * * * *